(12) United States Patent
Kuno et al.

(10) Patent No.: US 8,562,889 B2
(45) Date of Patent: Oct. 22, 2013

(54) METHOD FOR PRODUCING PLASTIC CYLINDER HEAD COVER

(75) Inventors: Tetsuya Kuno, Nagoya (JP); Takahiro Hiratsuka, Kariya (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 119 days.

(21) Appl. No.: 13/005,730

(22) Filed: Jan. 13, 2011

(65) Prior Publication Data
US 2011/0180963 A1 Jul. 28, 2011

(30) Foreign Application Priority Data

Jan. 22, 2010 (JP) .................................. 2010-12535
Jan. 22, 2010 (JP) .................................. 2010-12536

(51) Int. Cl.
B29C 45/14 (2006.01)
(52) U.S. Cl.
USPC ...................................... 264/275; 264/328.12
(58) Field of Classification Search
None
See application file for complete search history.

(56) References Cited

U.S. PATENT DOCUMENTS

| | | | | |
|---|---|---|---|---|
| 2,079,393 | A | * | 5/1937 | Benge .............................. 249/59 |
| 3,092,441 | A | * | 6/1963 | Bilderbeek .............. 285/133.11 |
| 6,082,780 | A | * | 7/2000 | Rowley et al. .............. 285/132.1 |
| 6,287,501 | B1 | * | 9/2001 | Rowley .......................... 264/254 |
| 7,250,003 | B2 | * | 7/2007 | Thompson ....................... 470/18 |
| 7,927,534 | B1 | * | 4/2011 | Seman et al. ................. 264/250 |
| 2007/0020063 | A1 | | 1/2007 | Thompson | 
| 2009/0235892 | A1 | | 9/2009 | Sumiya et al. |

FOREIGN PATENT DOCUMENTS

| | | |
|---|---|---|
| JP | 2006-316640 | 11/2006 |
| JP | 2007-107479 | 4/2007 |
| WO | 98/43795 | 10/1998 |

OTHER PUBLICATIONS

China Office action, dated Mar. 22, 2013 along with an english translation thereof.
Japan Office action, dated Apr. 23, 2013 along with an english translation thereof.

* cited by examiner

*Primary Examiner* — Edmund H. Lee
(74) *Attorney, Agent, or Firm* — Greenblum & Bernstein, P.L.C.

(57) ABSTRACT

A method produces a plastic cylinder head cover having an oil control valve holder as an integral part thereof by insert molding. The method includes a step of setting the oil control valve holder in one of a pair of molds that can approach and separate from each other; and a step of clamping the pair of molds and injecting plastic material. In the step of injecting plastic material, the oil control valve holder is set in the one mold with an insert pin being inserted in a hole thereof.
Another a method produces a plastic cylinder head cover having an oil control valve holder as an integral part thereof by insert molding. The oil control valve holder includes a mounting surface on which it is mounted to a cylinder head, a hole oriented along an axis inclined to a plane direction of the mounting surface, and two faces containing open ends of the hole. The method includes a step of setting the oil control valve holder in one of a pair of molds that can approach and separate from each other; and a step of clamping the pair of molds and injecting plastic material. In the step of injecting plastic material, the oil control valve holder is set in the one mold with an abutment insert being abutted against the mounting surface near one of the two faces having a larger area than the other.

6 Claims, 6 Drawing Sheets

METHOD FOR PRODUCING PLASTIC CYLINDER HEAD COVER

CROSS-REFERENCE TO RELATED APPLICATIONS

The present application claims priority under 35 U.S.C. §119 of Japanese Application No. 2010-12535 filed on Jan. 22, 2010 and Japanese Application No. 2010-12536 filed on Jan. 22, 2010, the disclosure of which is expressly incorporated by reference herein in its entirety.

BACKGROUND OF THE INVENTION

1. Field of the Invention

The present invention relates to a method and an apparatus for producing a plastic cylinder head cover, and more particularly to a method and an apparatus for producing a plastic cylinder head cover that can prevent deformation of a hole in an oil control valve holder during insert molding.

Another aspect of the present invention relates to a method and an apparatus for producing a plastic cylinder head cover, and more particularly to a method and an apparatus for producing a plastic cylinder head cover that can prevent deformation of a hole in an oil control valve holder during insert molding, as well as prevent scratches and deformation of a mounting surface of the oil control valve holder.

2. Description of Related Art

Conventionally, a cylinder head cover for internal combustion engines is commonly known, which has a metallic oil control valve (hereinafter also referred to in abbreviation as "OCV") holder for attaching an OCV retrofitted with bolts to a cover body. This OCV holder is typically formed with a hole for attaching an OCV and communication passages for connecting oil passages in the OCV with oil passages or the like on the side of the cylinder head. The problem with this cylinder head cover is that, because the OCV holder is retrofitted, the number of production man-hours is large and the production cost is high.

Therefore, as a cylinder head cover that solves the above problem, a plastic cylinder head cover having an OCV holder as an integral part thereof by insert molding has been proposed (see, for example, Japanese Laid-Open Patent Application Publication (JP-A) Nos. 2006-316640 and 2007-107479). JP-A-2006-316640 discloses plugging both of the open axial ends of the hole of the OCV holder during insert molding (see JP-A-2006-316640, paragraph [0043] and FIG. 6). This prevents plastic material from entering the hole of the OCV holder.

The above JP-A-2007-107479 discloses an OCV holder having a mounting surface on which it is mounted to the cylinder head, a hole oriented along an axis inclined to a plane direction of this mounting surface, and two faces containing open ends of this hole (see JP-A-2007-107479, FIG. 6). During insert molding of this OCV holder, one of the two faces which has a larger area is subjected to a relatively large pressure from the plastic material. In some cases, for example, this may cause deformation of a lower corner of the OCV holder 103 as indicated by an imaginary line in FIG. 11, leading to deformation of the hole 107 (see, for example, FIG. 12B). Such deformation of the hole of the OCV holder may cause oil leakage between the OCV holder and the OCV during use of the cylinder head cover. Accordingly, in the above JP-A-2007-107479, the OCV holder is set such that its mounting surface is entirely abutted against a lower mold during insert molding so as to prevent deformation of the hole of the OCV holder (see JP-A-2007-107479, FIGS. 13 and 14).

However, with the plastic cylinder head cover disclosed in the above JPA-2006-316640, a middle part of the hole of the OCV holder remains hollow during insert molding. Because of this, the hole 107 of the OCV holder 103 may sometimes deform by the plastic material filling pressure during the molding and contraction after the molding, for example as shown in FIGS. 11 and 12. Such deformation of the hole 107 of the OCV holder 103 may cause oil leakage between the OCV holder and the OCV during use of the cylinder head cover.

It is difficult to enhance the dimensional accuracy of both the hole and the mounting surface of the OCV holder relative to the cover body of the cylinder head cover. It is therefore the practice, for example, to enhance the dimensional accuracy of the hole relative to the cover body while the dimensional accuracy of the mounting surface is lowered. In this case, with the plastic cylinder head cover disclosed in the above JP-A-2007-107479, because the mounting surface of the OCV holder is entirely abutted against the lower mold, the mounting surface of the OCV holder is susceptible to scratches and to deformation due to excessive pressure exerted thereto. This may result in oil leakage between the OCV holder and the cylinder head during use of the cylinder head cover.

SUMMARY OF THE INVENTION

The embodiments of the present invention have been made in view of the above circumstances, and its object is to provide a method and an apparatus for producing a plastic cylinder head cover that can prevent deformation of a hole in an oil control valve holder during insert molding.

Another aspect of the embodiments of the present invention have been made in view of the above circumstances, and its object is to provide a method and an apparatus for producing a plastic cylinder head cover that can prevent deformation of a hole in an oil control valve holder during insert molding, as well as prevent scratches and deformation of a mounting surface of the oil control valve holder.

One aspect of the present embodiments provides a method of producing a plastic cylinder head cover having an oil control valve holder as an integral part thereof by insert molding, the method including a step of setting the oil control valve holder in one of a pair of molds that can approach and separate from each other; and a step of clamping the pair of molds and injecting plastic material, wherein in the step of injecting plastic material, the oil control valve holder is set in the one mold with an insert pin being inserted in a hole thereof.

In a further aspect, the oil control valve holder is heated when the insert pin is inserted into the hole of the oil control valve holder.

One aspect of the present embodiments provides an apparatus for producing a plastic cylinder head cover having an oil control valve holder as an integral part thereof by insert molding, the apparatus including a pair of molds that can approach and separate from each other; and an insert pin that can be inserted into a hole of the oil control valve holder set in one of the pair of molds.

Another aspect of the present embodiments provides a method of producing a plastic cylinder head cover having an oil control valve holder as an integral part thereof by insert molding, wherein the oil control valve holder includes a mounting surface on which it is mounted to a cylinder head, a hole oriented along an axis inclined to a plane direction of the mounting surface, and two faces containing open ends of the hole, the method including a step of setting the oil control valve holder in one of a pair of molds that can approach and separate from each other; and a step of clamping the pair of molds and injecting plastic material, wherein in the step of injecting plastic material, the oil control valve holder is set in the one mold with an abutment insert being abutted against the mounting surface near one of the two faces having a larger area than the other.

In a further aspect, the pair of molds has a mold structure in which a mold cavity near one of the two faces, which has a smaller area than the other, of the oil control valve holder has a thickness that is smaller than a thickness of other mold cavities.

Another aspect of the present embodiments provides an apparatus for producing a plastic cylinder head cover having an oil control valve holder as an integral part thereof by insert molding, wherein the oil control valve holder includes a mounting surface on which it is mounted to a cylinder head, a hole oriented along an axis inclined to a plane direction of the mounting surface, and two faces containing open ends of the hole, the apparatus including a pair of molds that can approach and separate from each other; and an abutment insert that can be abutted against the mounting surface near one of the two faces, which has a larger area than the other, of the oil control valve holder set in one of the pair of molds.

According to the method and apparatus for producing a plastic cylinder head cover of the present embodiments, the pair of molds is clamped and the plastic material is injected, with an insert pin being inserted in the hole of the oil control valve holder set in one of the molds. Thereby, the hole of the oil control valve holder is entirely supported by the insert pin during the insert molding, and the hole is prevented from being deformed due to the filling pressure during the molding and the contraction after the molding of the plastic material.

The oil control valve holder may be heated when the insert pin is inserted into the hole of the oil control valve holder, so that the hole of the oil control valve holder is spread by the heat to facilitate insertion of the insert pin.

According to another aspect of the method and apparatus for producing a plastic cylinder head cover of the present embodiments, the pair of molds is clamped and the plastic material is injected, with the abutment insert being abutted against the mounting surface near one of the two faces, which has a larger area than the other, of the oil control valve holder set in one of the molds, and with the abutment insert being not abutted against other part of the mounting surface except the part near the face with the larger area. Therefore, part of the mounting surface of the oil control valve holder that is relatively easy to deform during the insert molding is supported by the abutment insert in a concentrated manner, whereby deformation of the hole of the oil control valve holder is prevented. Part of the mounting surface of the oil control valve holder that is relatively hard to deform is not supported by the abutment insert. This enables to prevent scratches on the mounting surface or deformation caused by excessive pressure exerted thereto.

The pair of molds may have a mold structure in which a mold cavity near one of the two faces, which has a smaller area than the other, of the oil control valve holder has a smaller thickness than the thicknesses of other mold cavities. In this case, the plastic material near the face, which has a smaller area than the other, of the oil control valve holder is cooled faster because of the thin mold cavity, whereby the plastic material is prevented from penetrating into the gap between the mounting surface of the oil control valve holder and the abutment insert.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

1. Method of Producing a Plastic Cylinder Head Cover

A method of producing a plastic cylinder head cover according to Embodiment 1 is a method of producing a plastic cylinder head cover having an oil control valve holder (hereinafter also referred to in abbreviation as "OCV holder") as an integral part thereof by insert molding, the method comprising a step of setting an OCV holder in one of a pair of molds that can approach and separate from each other, and a step of clamping the pair of molds and injecting plastic material, wherein, in the step of injecting plastic material, the OCV holder is set in one of the molds with an insert pin being inserted in a hole thereof (see, for example, FIG. 7).

The insert pin may have a shaft diameter tolerance of, for example, h7 to m6 according to the JIS standards, and the hole of the OCV holder may have a hole diameter tolerance of H7 according to the JIS standards. Thereby, deformation of the hole of the OCV holder can be reliably prevented by the insert pin during the insert molding. The insert pin may have a large-diameter portion inserted into the hole of the OCV holder, and a small-diameter portion axially continuous with this large-diameter portion and inserted into the hole of the OCV holder (see, for example, FIG. 10). Thereby, the large-diameter portion is inserted to a corresponding portion in the hole of the OCV holder that is subjected to a relatively large pressure from the plastic material during the molding and easy to deform, so as to prevent deformation of the hole. In addition, the small-diameter portion is inserted to a corresponding portion that is subjected to a relatively small pressure from the plastic material and hard to deform, so as to facilitate insertion.

The method of producing a plastic cylinder head cover according to the Embodiment 1 may include a form, for example, in which the OCV holder is heated when the insert pin is inserted into the hole of the OCV holder. The heating temperature for this OCV holder may be, for example, 30 to 100° C. (preferably 50 to 80° C.). This OCV holder may be, for example, preheated by heating means such as a heater before being set in one of the molds. Thereby, the OCV holder can be heated efficiently.

Figure 6:
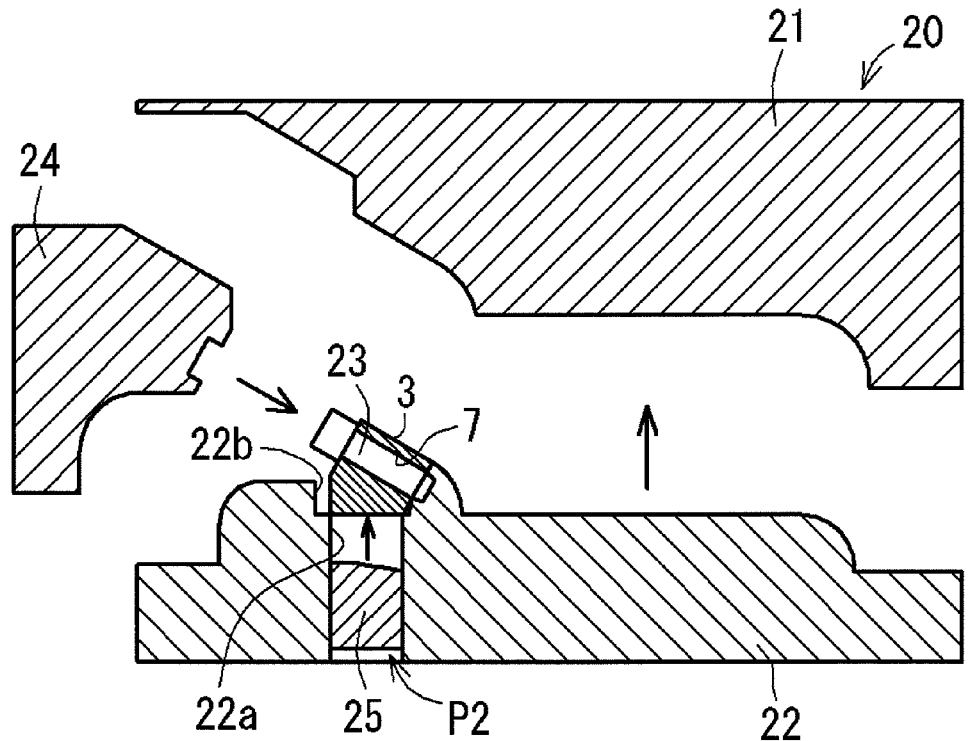
FIG. 6 is an explanatory diagram for explaining a method of producing the cylinder head cover.

The method of producing a plastic cylinder head cover according to the Embodiment 1 may include a form, for example, in which, in the step of setting the OCV holder, the OCV holder is set with the insert pin being inserted in the hole (see, for example, FIG. 6). Thereby, the insert pin can be inserted into the hole of the OCV holder more smoothly.

Figure 7:
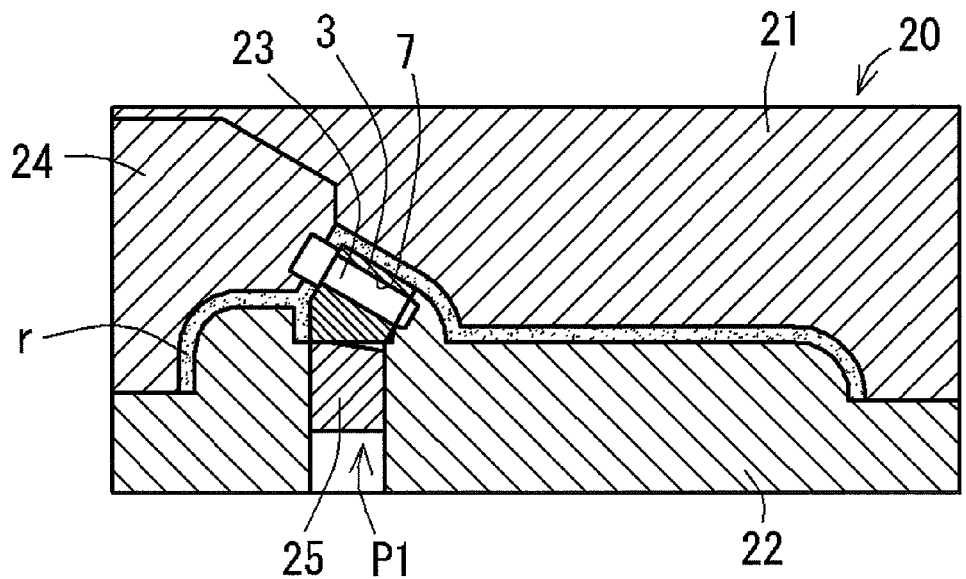
FIG. 7 is an explanatory diagram for explaining a method of producing the cylinder head cover.

The method of producing a plastic cylinder head cover according to the Embodiment 1 may include a form, for example, in which, in the step of injecting the plastic material, a support mold that cooperates with the pair of molds to clamp the molds abuts on one shaft end of the insert pin (see, for example, FIG. 7). Thereby, the insert pin can be supported more reliably during the molding.

Figure 8:
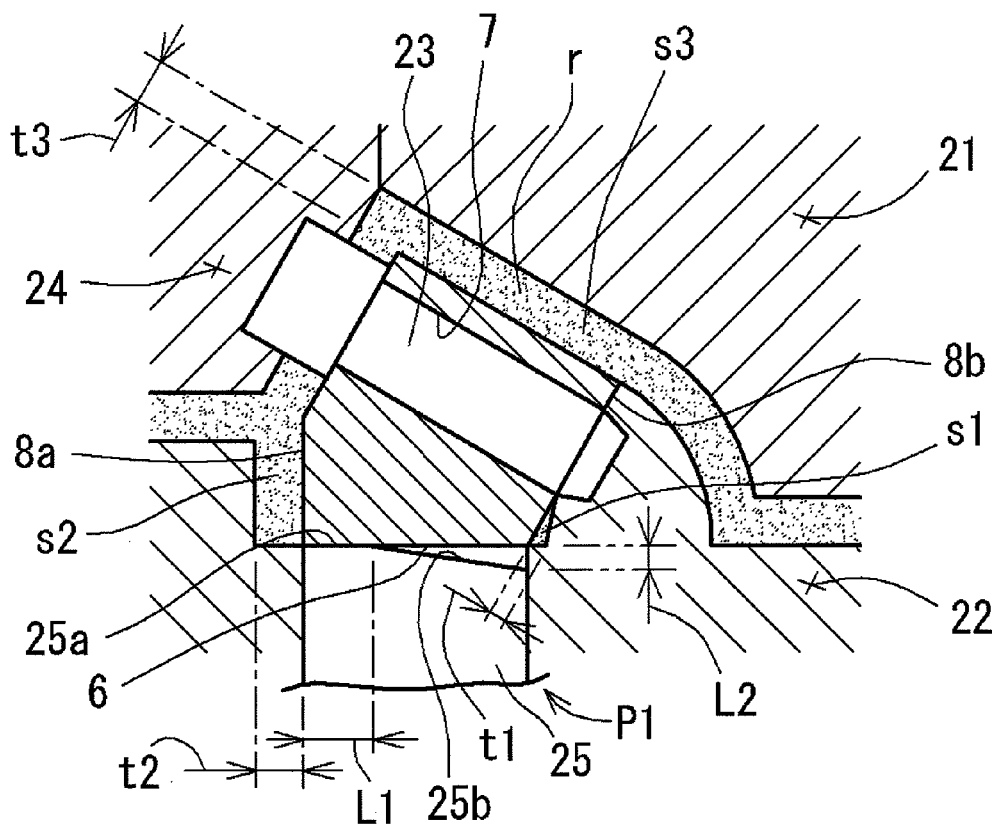
FIG. 8 is an enlarged view of essential parts of FIG. 7.

The method of producing a plastic cylinder head cover according to the Embodiment 1 may include a form, for example, in which the OCV holder includes a mounting surface on which it is mounted to a cylinder head, a hole oriented along an axis inclined to a plane direction of the mounting surface, and two faces containing open ends of the hole, and in the step of injecting plastic material, the OCV holder is set in one of the molds with an abutment insert being abutted against the mounting surface near one of the two faces which has a larger area than the other (see, for example, FIG. 8). According to this form, the pair of molds is clamped and the plastic material is injected, with the abutment insert being abutted against the mounting surface near one of the two faces, which has a larger area than the other, of the OCV holder set in one of the molds, and with the abutment insert being not abutted against other part of the mounting surface except the part near the face with the larger area. Therefore, part of the mounting surface of the OCV holder that is relatively easy to deform is supported by the abutment insert in a concentrated manner during the insert molding, whereby deformation of the hole of the OCV holder is prevented. Part of the mounting surface of the OCV holder that is relatively hard to deform is not supported by the abutment insert. This enables to prevent scratches on the mounting surface or deformation caused by excessive pressure exerted thereto.

The abutting distance (L1) between the abutment insert and the mounting surface of the OCV holder may be, for example, 0.5 to 5 mm, from a distal end edge of the mounting surface intersecting with the face having a larger area than the other toward the face having a smaller area than the other (see, for example, FIG. 8). The gap distance (L2) between the abutment insert and the mounting surface of the OCV holder may be, for example, 0.05 to 0.2 mm (see, for example, FIG. 8).

In the form described above, the pair of molds may have a mold structure, for example, in which a mold cavity (s1) near one of the two faces, which has a smaller area than the other, of the OCV holder has a smaller thickness (t1) than the thicknesses (t2, t3) of other mold cavities (s2, s3) (see, for example, FIG. 8). The above "other mold cavities" may include, for example, a mold cavity (s2) near the face having a larger area than the other, and a cylindrical mold cavity (s3) on the outer circumference of the hole (see, for example, FIG. 8).

2. Apparatus for Producing a Plastic Cylinder Head Cover

An apparatus for producing a plastic cylinder head cover according to Embodiment 2 is an apparatus for producing a plastic cylinder head cover having an oil control valve holder (hereinafter also referred to in abbreviation as "OCV holder") as an integral part thereof by insert molding, the apparatus comprising a pair of molds that can approach and separate from each other, and an insert pin that can be inserted into a hole of the OCV holder set in one of the pair of molds (see, for example, FIG. 7).

The insert pin may be, for example, the one that is obtained by applying the configuration of the insert pin described in conjunction with the method of producing a plastic cylinder head cover according to the Embodiment 1.

The apparatus for producing a plastic cylinder head cover according to the Embodiment 2 may include a form which further includes a support mold that cooperates with the pair of molds to clamp the molds as well as abuts on one shaft end of the insert pin inserted in the hole of the OCV holder set in one of the molds (see, for example, FIG. 7). Thereby, the insert pin can be supported more reliably during the insert molding.

The apparatus for producing a plastic cylinder head cover according to the Embodiment 2 may include a form in which the OCV holder includes a mounting surface on which it is mounted to a cylinder head, a hole oriented along an axis inclined to a plane direction of the mounting surface, and two faces containing open ends of the hole, and the apparatus further comprises an abutment insert that can be abutted against the mounting surface near one of the two faces having a larger area than the other of the OCV holder set in one of the pair of molds (see, for example, FIG. 7). According to this form, the pair of molds is clamped and the plastic material is injected, with the abutment insert being abutted against the mounting surface near one of the two faces, which has a larger area than the other, of the OCV holder set in one of the molds, and with the abutment insert being not abutted against other part of the mounting surface except the part near the face with the larger area. Therefore, part of the mounting surface of the OCV holder that is relatively easy to deform is supported by the abutment insert in a concentrated manner during the insert molding, whereby deformation of the hole of the OCV holder is prevented. Part of the mounting surface of the OCV holder that is relatively hard to deform is not supported by the abutment insert. This enables to prevent scratches on the mounting surface or deformation caused by excessive pressure exerted thereto.

The abutment insert may be, for example, the one that is obtained by applying the configuration of the abutment insert described in conjunction with the method of producing a plastic cylinder head cover according to the Embodiment 1. The pair of molds may be, for example, the one that is obtained by applying the configuration of the pair of molds described in conjunction with the method of producing a plastic cylinder head cover according to the Embodiment 1.

The embodiment described above may include a form, for example, which further includes an abutment insert displacing means for displacing the abutment insert between an abutting position where it abuts against the mounting surface of the OCV holder and a separate position where it is separate from the mounting surface of the OCV holder. Thereby, the oil control valve holder can be readily set into one of the molds, with the abutment insert being positioned at the separate position. The abutment insert displacing means may include, for example, (1) a form having a drive source (e.g., drive cylinder, drive motor and the like) for moving the abutment insert relative to one mold, and (2) a form having a power conversion mechanism for converting relative movement of the pair of molds into the movement of the abutment insert.

3. Method of Producing a Plastic Cylinder Head Cover

A method of producing a plastic cylinder head cover according to Embodiment 3 is a method of producing a plastic cylinder head cover having an oil control valve holder (hereinafter also referred to in abbreviation as "OCV holder"), wherein the OCV holder includes a mounting surface on which it is mounted to a cylinder head, a hole oriented along an axis inclined to a plane direction of the mounting surface, and two faces containing open ends of the hole, and the method comprises a step of setting the OCV holder in one of a pair of molds that can approach and separate from each other, and a step of clamping the pair of molds and injecting plastic material, wherein, in the step of injecting plastic material, the OCV holder is set in one of the molds with an abutment insert being abutted against the mounting surface near one of the two faces which has a larger area than the other (see, for example, FIG. 7).

The abutting distance (L1) between the abutment insert and the mounting surface of the OCV holder may be, for example, 0.5 to 5 mm, from a distal end edge of the mounting surface intersecting with the face having a larger area than the other toward the face having a smaller area than the other (see, for example, FIG. 8). The gap distance (L2) between the abutment insert and the mounting surface of the OCV holder may be, for example, 0.05 to 0.2 mm (see, for example, FIG. 8).

The method of producing a plastic cylinder head cover according to the Embodiment 3 may include a form, for example, in which the pair of the molds has a mold structure, in which a mold cavity (s1) near one of the two faces, which has a smaller area than the other, of the OCV holder has a smaller thickness (t1) than the thicknesses (t2, t3) of other mold cavities (s2, s3) (see, for example, FIG. 8). The above "other mold cavities" may include, for example, a mold cavity (s2) near the face having a larger area than the other, and a cylindrical mold cavity (s3) on the outer circumference of the hole (see, for example, FIG. 8).

The method of producing a plastic cylinder head cover according to the Embodiment 3 may include a form, for example, in which, in the step of injecting the plastic material, the OCV holder is set in one of the molds with the insert pin being inserted in a hole thereof (see, for example, FIG. 7). According to this form, the pair of molds is clamped and the plastic material is injected, with the insert pin being inserted in the hole of the OCV holder set in one of the molds. Therefore, the hole of the OCV holder is entirely supported by the insert pin during the insert molding, so that the hole is prevented from being deformed by the plastic material filling pressure during the molding and the contraction after the molding.

The insert pin may have a shaft diameter tolerance of, for example, h7 to m6 according to the JIS standards, and the hole of the OCV holder may have a hole diameter tolerance of H7 according to the JIS standards. Thereby, deformation of the hole of the OCV holder can be reliably prevented by the insert pin during the insert molding. The insert pin may have a large-diameter portion inserted into the hole of the OCV holder and a small-diameter portion axially continuous with this large-diameter portion and inserted into the hole of the OCV holder (see, for example, FIG. 10). Thereby, the large-diameter portion is inserted to a corresponding portion in the hole of the OCV holder that is subjected to a relatively large pressure from the plastic material during the molding and easy to deform, so as to prevent deformation of the hole. In addition, the small-diameter portion is inserted to a corresponding portion that is subjected to a relatively small pressure from the plastic material and hard to deform, so as to facilitate insertion.

In the form described above, for example, the OCV holder may be heated when the insert pin is inserted into the hole of the OCV holder. This heating spreads the hole of the oil control valve holder, so as to facilitate insertion of the insert pin. The heating temperature for this OCV holder may be, for example, 30 to 100° C. (preferably 50 to 80° C.). This OCV holder may be, for example, preheated by heating means such as a heater before being set in one of the molds. Thereby, the OCV holder can be heated efficiently.

In the form described above, for example, in the step of setting the OCV holder, the OCV holder may be set with the insert pin being inserted in the hole thereof (see, for example, FIG. 6). Thereby, the insert pin can be inserted into the hole of the OCV holder more smoothly.

The embodiment described above may include a form, for example, in which, in the step of injecting the plastic material, a support mold that cooperates with the pair of molds to clamp the molds abuts on one shaft end of the insert pin (see, for example, FIG. 7). Thereby, the insert pin can be supported more reliably during the molding.

4. Apparatus for Producing a Plastic Cylinder Head Cover

An apparatus for producing a plastic cylinder head cover according to Embodiment 4 is an apparatus for producing a plastic cylinder head cover having an oil control valve holder (hereinafter also referred to in abbreviation as "OCV holder") as an integral part thereof by insert molding, wherein the OCV holder includes a mounting surface on which it is mounted to a cylinder head, a hole oriented along an axis inclined to a plane direction of the mounting surface, and two faces containing open ends of the hole, and the apparatus comprises a pair of molds that can approach and separate from each other, and an abutment insert that can be abutted against the mounting surface near one of the two faces, which has a larger area than the other, of the OCV holder set in one of the pair of molds (see, for example, FIG. 7).

The abutment insert may be, for example, the one that is obtained by applying the configuration of the abutment insert described in conjunction with the method of producing a plastic cylinder head cover according to the Embodiment 3. The pair of molds may be, for example, the one that is obtained by applying the configuration of the pair of molds described in conjunction with the method of producing a plastic cylinder head cover according to the Embodiment 3.

The apparatus for producing a plastic cylinder head cover according to the Embodiment 4 may include a form, for example, which further includes an abutment insert displacing means for displacing the abutment insert between an abutting position where it abuts against the mounting surface of the OCV holder and a separate position where it is separate from the mounting surface of the OCV holder. Thereby, the oil control valve holder can be readily set into one of the molds, with the abutment insert being positioned at the separate position. The abutment insert displacing means may include, for example, (1) a form having a drive source (e.g., cylinder, drive motor and the like) for sliding the abutment insert relative to one mold, and (2) a form having a power conversion mechanism for converting relative movement of the pair of molds into the sliding movement of the abutment insert.

The apparatus for producing a plastic cylinder head cover according to the Embodiment 4 may include a form, for example, which further includes an insert pin that can be inserted into a hole of the OCV holder set in one of the pair of molds (see, for example, FIG. 7). According to this embodiment, the pair of molds is clamped and the plastic material is injected, with the insert pin being inserted in the hole of the OCV holder set in one of the molds. Thereby, the hole of the OCV holder is entirely supported by the insert pin during the insert molding, so that the hole is prevented from being deformed by the plastic material filling pressure during the molding and the contraction after the molding.

The insert pin may be, for example, the one that is obtained by applying the configuration of the insert pin described in conjunction with the method of producing a plastic cylinder head cover according to the Embodiment 3.

EXAMPLES

The present invention will be hereinafter described in specific terms by way of examples using the drawings.

(1) Configuration of Cylinder Head Cover

Figure 1:
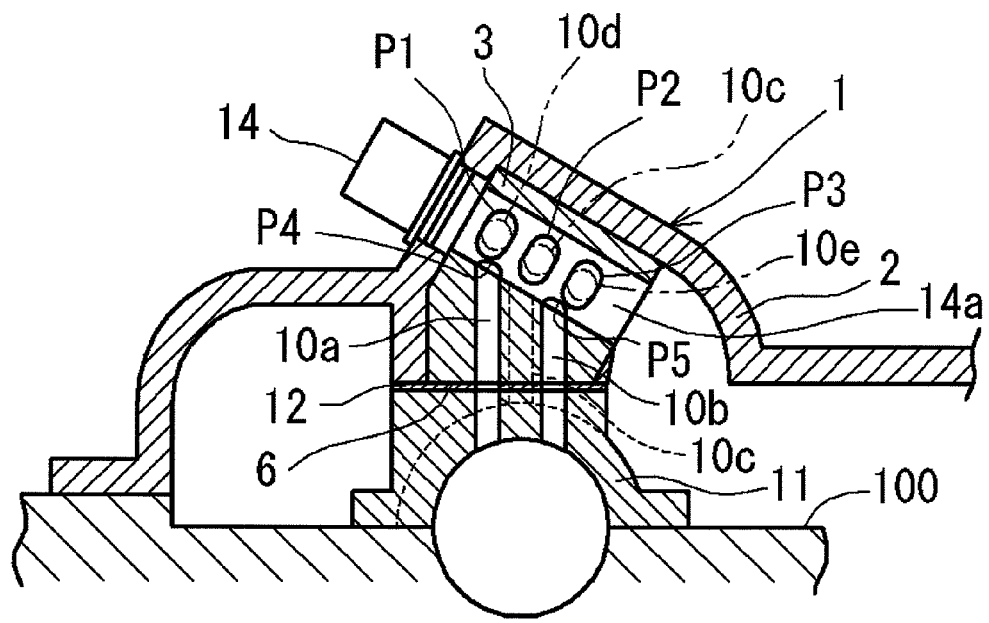
FIG. 1 is a longitudinal cross-sectional view of essential parts of an engine equipped with a cylinder head cover according to one embodiment (with an OCV attached)
Figure 2:
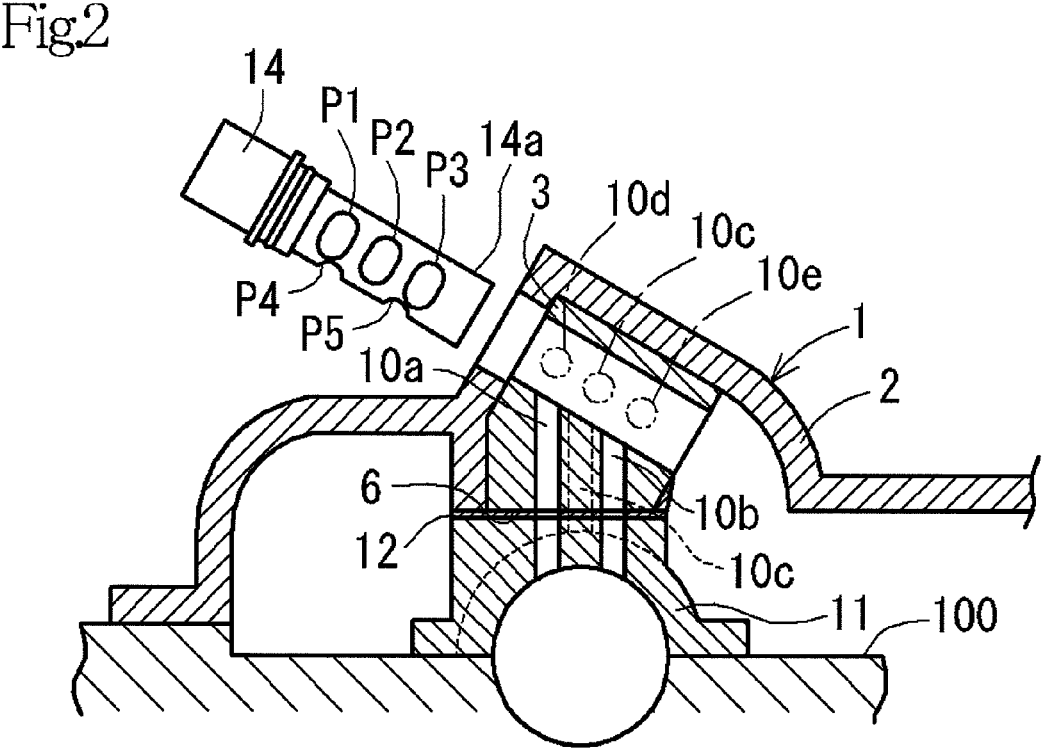
FIG. 2 is a longitudinal cross-sectional view of essential parts of an engine equipped with a cylinder head cover according to one embodiment (prior to attachment of an OCV)

A cylinder head cover 1 according to this example includes a plastic cover body 2, and an oil control valve holder 3 (hereinafter also referred to in abbreviation as "OCV holder 3") that is united with this cover body 2 by insert molding, as shown in FIGS. 1 and 2.

Figure 3A:
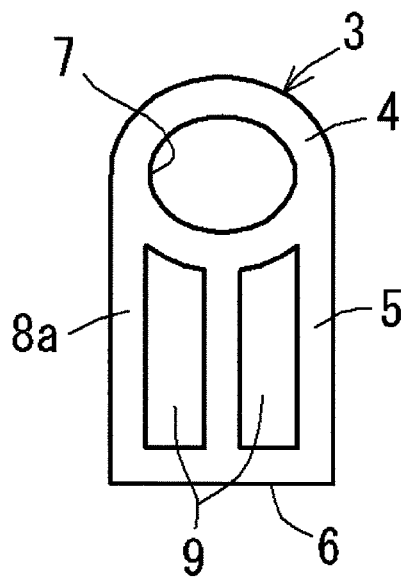
FIGS. 3A and 3B are explanatory diagrams for explaining the OCV holder according to one embodiment, FIG. 3A showing a front view of the OCV holder and FIG. 3B showing a side view of the OCV holder.
Figure 3B:
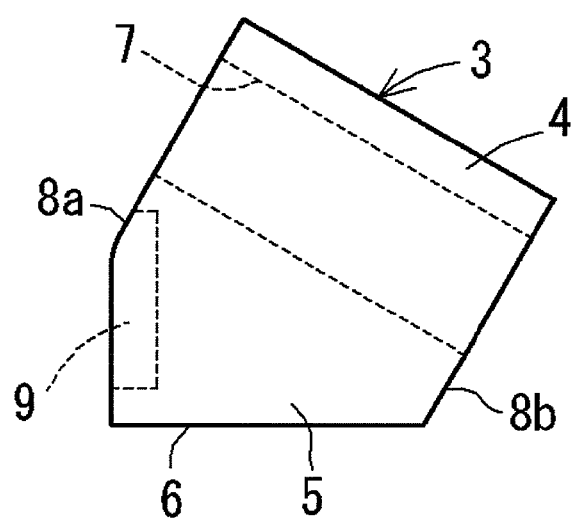
Figure 4:
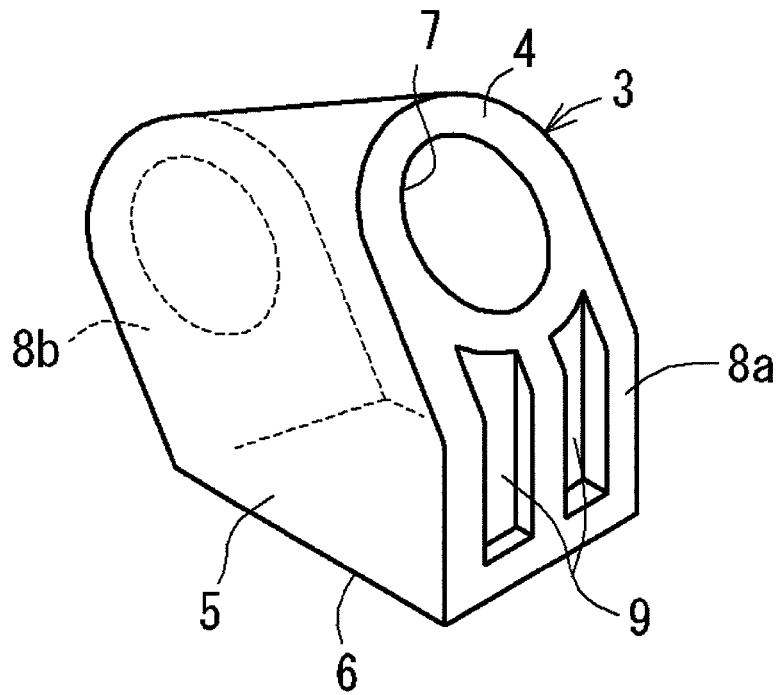
FIG. 4 is a perspective view of the OCV holder.

The OCV holder 3 is configured, as shown in FIGS. 3 and 4, to have a cylindrical sleeve 4 and a connecting part 5 which is for supplying working oil and communicates with this sleeve 4. In this example, for the material of the OCV holder 3, a metal material (such as an aluminum alloy or the like) is employed which has the same coefficient of thermal expansion as that of a spool housing 14a of the OCV 14 (see FIG. 1).

The connecting part 5 for supplying working oil is formed with a mounting surface 6 that is to be closely attached to an upper face of a cam cap 11 (see FIG. 1) via a gasket 12. The sleeve 4 is formed with a hole 7 oriented along an axis inclined to the plane direction of the mounting surface 6 of the connecting part 5 for supplying working oil. The hole 7 has a diameter tolerance of H7 according to the JIS standards. In addition, the OCV holder 3 is provided with two faces 8a and 8b respectively containing the open ends of the hole 7. The face 8a, which is one of these faces 8a and 8b, has a larger area than the other face 8b. This face 8a is formed with recesses 9 for preventing formation of voids or the like.

The connecting part 5 for supplying working oil is formed with oil channels 10a, 10b, 10c, 10d, and 10e opened in the hole at corresponding positions of five ports P1, P2, P3, P4, and P5 provided to the spool housing 14a of the OCV 14, as shown in FIGS. 1 and 2. Of these oil channels 10a to 10e, three oil channels 10a, 10b, and 10c corresponding to three ports P2, P4, and P5 open in the mounting surface 6 of the connecting part 5 for supplying working oil. The oil channels 10d and 10e open into an interior space of the cylinder head cover 1.

Of the oil channels 10a to 10e, the oil channel 10c is a working oil supplying channel, to which high-pressure working oil is supplied from a hydraulic pump through an oil passage on the side of the cylinder head 100. The oil channels 10a and 10b are working oil supplying channels, to which the high-pressure working oil is selectively supplied from the oil channel 10c via the OCV 14 so as to supply the high-pressure working oil to valve timing advance chambers or retard chambers inside a variable valve timing mechanism (not shown). When one of the oil channels 10a and 10b is supplying high-pressure working oil to the variable valve timing mechanism, the other is used as a passage for discharging working oil from the variable valve timing mechanism. The oil channels 10d and 10e are working oil discharging channels for discharging the working oil coming out through the OCV 14 when one of the oil channels 10a and 10b is discharging working oil from the variable valve timing mechanism directly into the interior space of the cylinder head cover 1.

(2) Apparatus for Producing the Cylinder Head Cover

Next, an apparatus 20 for producing the cylinder head cover 1 will be described. As shown in FIGS. 6 and 7, this production apparatus 20 comprises a fixed mold 21 and a movable mold 22 (illustrated as "a pair of molds" according to the present invention), a support mold 24 that cooperates with these fixed mold 21 and movable mold 22 for clamping the molds, an insert pin 23, and an abutment insert 25. The movable mold 22 (illustrated as "one of the molds" according to the present invention) is configured to be able to approach and separate from the fixed mold 21 in a horizontal direction. The insert pin 23 is configured such that it can be inserted into the hole 7 of the OCV holder 3 set in a recess 22b of the movable mold 22. The abutment insert 25 is configured such that it can be abutted against the mounting surface 6 near the face 8a with a larger area of the two faces 8a and 8b of the OCV holder 3 set in the recess 22b of the movable mold 22.

Figure 5:
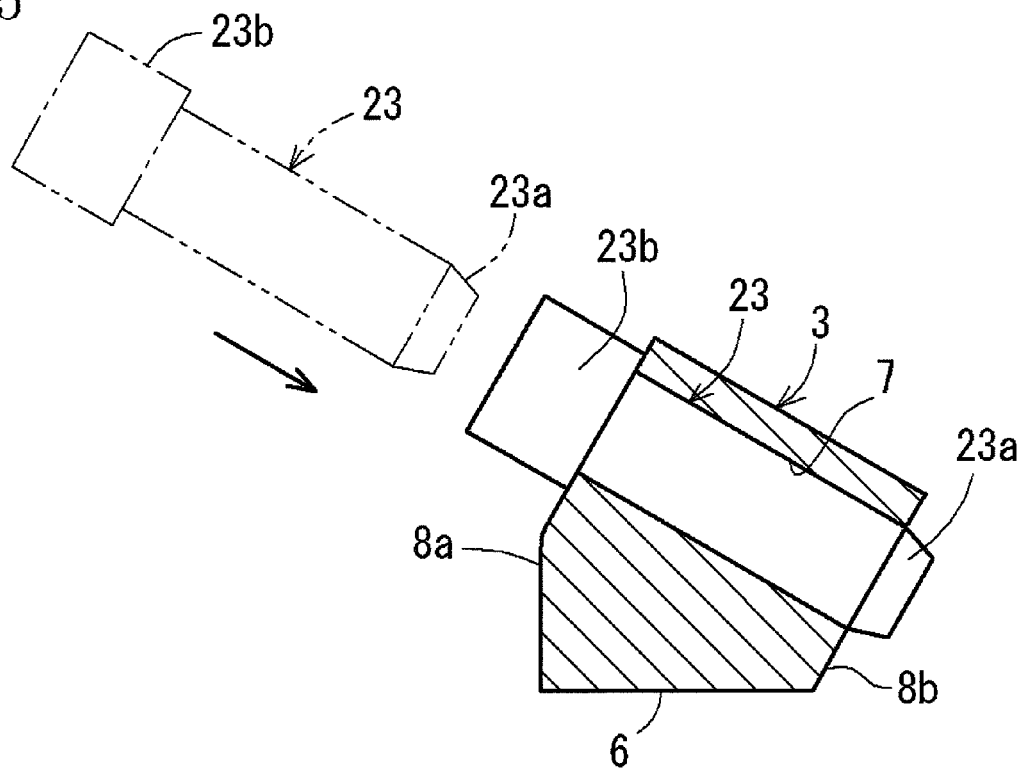
FIG. 5 is an explanatory diagram for explaining a method of producing the cylinder head cover.

The insert pin 23 has a shaft diameter tolerance of h7 according to the JIS standards. A tapered portion 23a reducing in diameter toward the distal end is provided to one shaft end of the insert pin 23 as shown in FIG. 5 so as to facilitate insertion into the hole 7 of the OCV holder 3. A head portion 23b is provided to the other shaft end of this insert pin 23.

The support mold 24 is supported such as to be slidable along an axial direction of the hole 7 of the OCV holder 3 set in the recess 22b of the movable mold 22 as shown in FIGS. 6 and 7, so that it is slid by a drive means (not shown) such as a drive cylinder or the like. With this sliding movement, the support mold 24 cooperates with the fixed mold 21 and movable mold 22 to clamp the molds and abuts on the head portion 23b of the insert pin 23 inserted in the hole 7 of the OCV holder 3 set in the movable mold 22.

As shown in FIG. 8, at the distal end of the abutment insert 25 are formed an abutment surface 25a that can abut against the mounting surface 6 near the face 8a of the OCV holder 3 set in the movable mold 22, and an inclined non-abutment surface 25b that does not abut against the mounting surface 6 of the OCV holder 3. The abutting distance L1 between the abutment surface 25a of the abutment insert 25 and the mounting surface 6 of the OCV holder 3 is about 2 mm, from a distal end edge of the mounting surface 6 intersecting with the face 8a toward the side of the face 8b. The maximum gap distance L2 between the non-abutment surface 25b of the abutment insert 25 and the mounting surface 6 of the OCV holder 3 is about 0.1 mm.

The abutment insert 25 is supported such as to be movable inside a passage 22a formed in the movable mold 22 along a direction in which the movable mold 22 moves, as shown in FIGS. 6 and 7, and is slid by means of a force converted from a moving force of the movable mold 22 by a power conversion mechanism (not shown). By this sliding movement, the abutment insert 25 is displaced between an abutting position P1 (see FIG. 7) where its abutment surface 25a abuts against the mounting surface 6 of the OCV holder 3 and a separate position P2 (see FIG. 6) where it is separated from the mounting surface 6 of the OCV holder 3.

The fixed mold 21 and movable mold 22 have a mold structure in which, as shown in FIG. 8, a mold cavity s1 near the face 8b of the OCV holder 3 has a thickness t1 (of about 0.5 mm) that is smaller than the thickness t2 (of about 2 mm) of a mold cavity s2 near the face 8a of the OCV holder 3 and the thickness t3 (of about 2 mm) of a cylindrical mold cavity s3 on the outer circumference of the hole 7 of the OCV holder 3.

(3) Method of Producing the Cylinder Head Cover

Next, the method of producing the cylinder head cover 1 will be described. First, the OCV holder 3 is pre-heated to about 60° C. by heating means such as a heater. Next, as shown in FIG. 5, the insert pin 23 is inserted into the hole 7 of the heated OCV holder 3.

Successively, as shown in FIG. 6, the OCV holder 3 with the insert pin 23 inserted therein is set in the recess 22b of the movable mold 22 which is in a mold open state. In this mold open state, the abutment insert 25 is positioned at the separate position P2. After that, as shown in FIG. 7, the movable mold 22 and support mold 24 are slid relative to the fixed mold 21 to clamp the molds, and the abutment insert 25 at the separate position P2 is slid to the abutting position P1. This causes the support mold 24 to abut on the shaft end of the insert pin 23 mounted in the hole 7 of the OCV holder 3 set in the movable mold 22. Also, the abutment surface 25a of the abutment insert 25 abuts against the mounting surface 6 of the OCV holder 3 (see FIG. 8).

Figure 9:
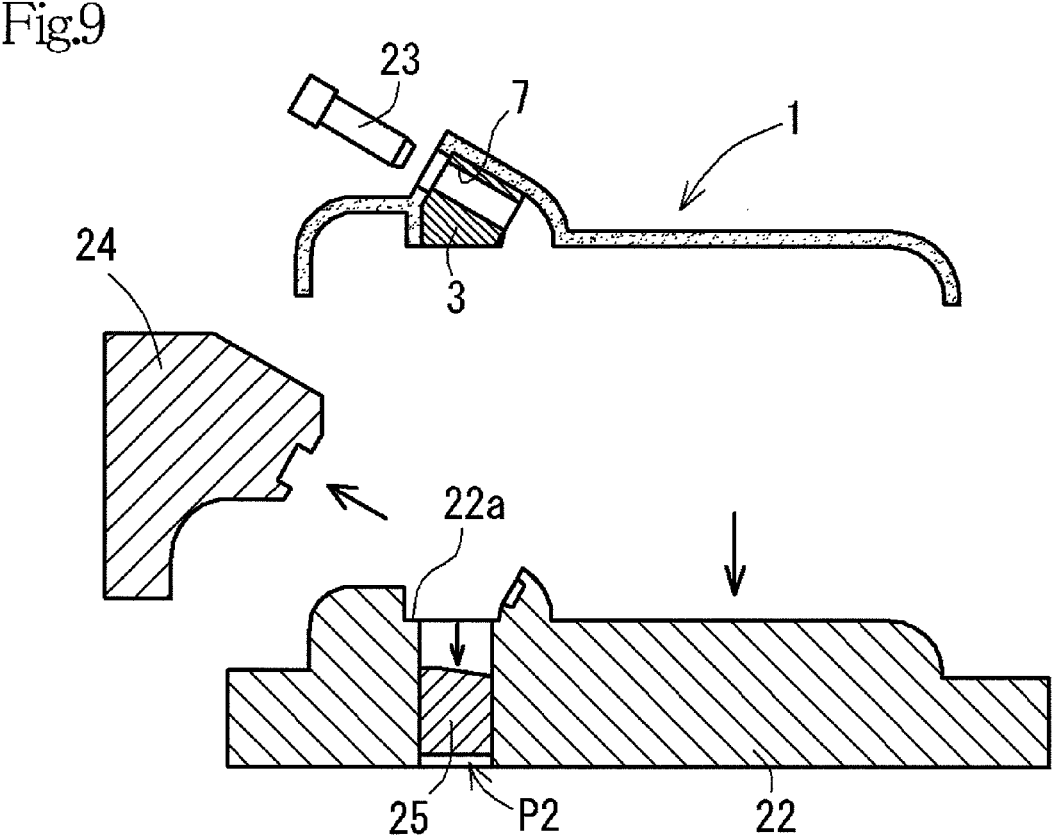
FIG. 9 is an explanatory diagram for explaining a method of producing the cylinder head cover.

Next, in the mold clamped state, molten plastic material r is injected into the mold cavities formed among the fixed mold 21, movable mold 22, and support mold 24 and then cooled. Successively, as shown in FIG. 9, the movable mold 22 and support mold 24 are slid relative to the fixed mold 21 to open the molds, and the abutment insert 25 in the abutting position P1 is slid to the separate position P2. In this state, a molded product is taken out from the movable mold 22, and the insert pin 23 is removed from the hole 7 of the OCV holder 3, whereby the cylinder head cover 1 is obtained.

(4) Effects of the Example

As described above, according to this example of the method of producing the plastic cylinder head cover 1, the fixed mold 21 and movable mold 22 are clamped and the plastic material is injected, with the insert pin 23 being inserted in the hole 7 of the OCV holder 3 set in the movable mold 22. Therefore, the hole 7 of the OCV holder 3 is entirely supported by the insert pin 23 during the insert molding, and the hole 7 is prevented from being deformed by the plastic material filling pressure during the molding and the contraction after the molding.

In this example, the OCV holder 3 is already heated when the insert pin 23 is inserted into the hole 7 of the OCV holder 3, so that the hole 7 of the OCV holder 3 is spread by the heat to facilitate insertion of the insert pin 23.

In this example, the fixed mold 21 and movable mold 22 are clamped and the plastic material is injected, with the abutment insert 25 being abutted against the mounting surface 6 near the face 8a of the OCV holder 3 set in the movable mold 22, and with the abutment insert 25 being not abutted against other part of the mounting surface 6 except the part near the face 8a. Therefore, part of the mounting surface 6 of the OCV holder 3 that is relatively easy to deform during the insert molding is supported by the abutment insert 25 in a concentrated manner, whereby deformation of the hole 7 of the OCV holder 3 is prevented. Part of the mounting surface 6 of the OCV holder 3 that is relatively hard to deform is not supported by the abutment insert 25. This enables to prevent scratches on the mounting surface 6 or deformation caused by excessive pressure exerted thereto. In this example, the face 8a of the OCV holder 3 is formed with recesses 9 and the part near these recesses 9 will be subjected to a significantly large pressure from the plastic material. Nevertheless, as the holder is supported with the abutment insert 25 abutted against the mounting surface 6 near the face 8a of the OCV holder 3, the OCV holder 3 and the hole 7 are prevented from being deformed.

In this example, molds having a mold structure in which the thickness t1 of the mold cavity s1 near the face 8b of the OCV holder 3 is smaller than the thicknesses t2 and t3 of other mold cavities s2 and s3 are employed as the fixed mold 21 and movable mold 22. Therefore, the plastic material near the face 8b of the OCV holder 3 is cooled faster because of the thin mold cavity s1. Accordingly, the plastic material is prevented from penetrating into the gap between the mounting surface 6 of the OCV holder 3 and the abutment insert 25.

Further, in this example, the abutment insert 25 is displaceable between the abutting position P1 and separate position P2. Therefore, the OCV holder 3 can be readily set into the recess 22b of the movable mold 22, with the abutment insert 25 being positioned at the separate position P2.

Figure 10:
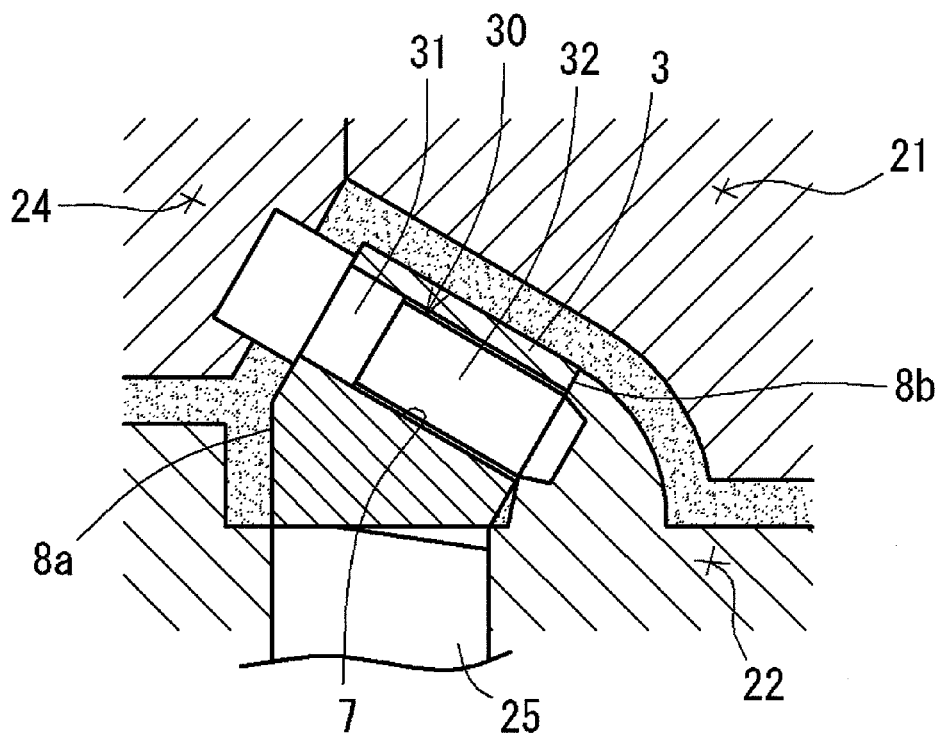
FIG. 10 is an explanatory diagram for explaining an insert pin according to alternative embodiment.
Figure 11:
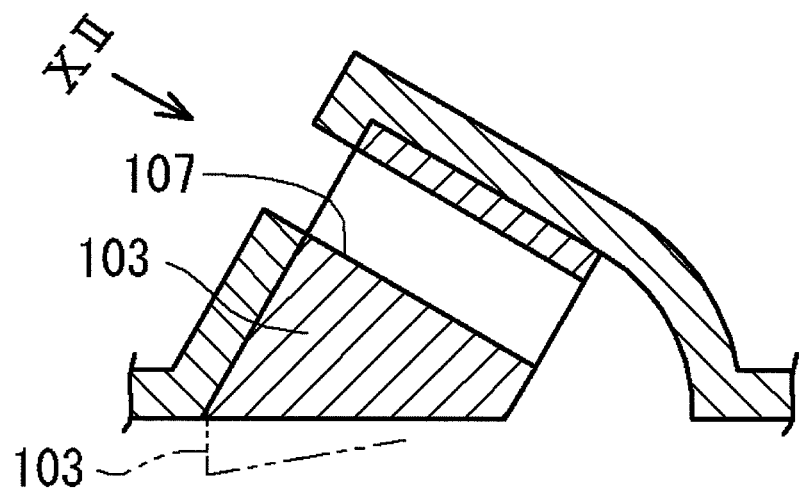
FIG. 11 is an explanatory diagram for explaining a conventional method of producing a cylinder head cover.
Figures 12A, 12B:
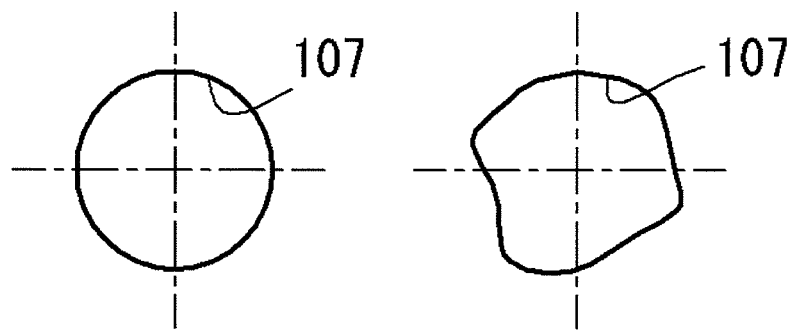
FIGS. 12A and 12B are diagrams viewed from the direction of arrow XII in FIG. 11, FIG. 12A showing the state of a hole in the OCV holder before the molding and FIG. 12B showing the state of the hole in the OCV holder after the molding.

The present invention is not limited to the above example, and other examples with various modifications are possible in accordance with the purposes and applications within the scope of the present invention. Namely, while the insert pin 23 has been illustrated in the above example as having a shaft with the same diameter as that of the hole 7 of the OCV holder 3 in which it is inserted, the invention is not limited to this. For example, as shown in FIG. 10, an insert pin 30 may be employed which has a large-diameter portion 31 inserted into the hole 7 near the face 8a of the OCV holder 3, and a small-diameter portion 32 axially continuous with this large-diameter portion 31 and inserted into other part of the hole 7 except the part near the face 8a of the OCV holder 3. Thereby, the large-diameter portion 31 is inserted to a corresponding portion in the hole 7 of the OCV holder 3 that is subjected to a relatively large pressure from the plastic material during the molding and easy to deform, so as to prevent deformation of the hole, while the small-diameter portion 32 is inserted to a corresponding portion that is subjected to a relatively small pressure from the plastic material and hard to deform, so as to facilitate insertion.

Also, while the OCV holder 3 is set in the movable mold 22 after the insert pin 23 is inserted into the hole 7 of the OCV holder 3 in the above example, the invention is not limited to this. For example, the insert pin 23 may be inserted into the hole 7 of the OCV holder 3 after the OCV holder 3 is set in the movable mold 22. In this case, the movable mold 22 may be provided, for example, with heating means such as a heater, so as to heat the OCV holder 3 set in the movable mold 22.

Further, while the fixed mold 21 and movable mold 22 that approach and separate from each other in an up and down direction have been illustrated as the pair of molds in the above example, the invention is not limited to this and may employ, for example, a pair of molds that approach and separate from each other in a horizontal direction.

The invention is widely applicable as a technique for producing a plastic cylinder head cover with an insert-molded metallic OCV holder for internal combustion engines.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

What is claimed is:

1. A method of producing a plastic cylinder head cover having an oil control valve holder as an integral part thereof by insert molding, the method comprising:
   inserting an insert pin in a hole of the oil control valve holder to close the hole of the oil control valve holder;
   setting the oil control valve holder having the insert pin in one of a pair of molds configured to approach and separate from each other;
   clamping the pair of molds with the set oil control valve holder;
   moving an abutment insert within a passage defined by the one of the pair of molds so as to abut against a mounting surface of the set oil control valve holder; and
   injecting a plastic material into mold cavities formed by the clamping of the pair of molds with the set oil control valve holder.

2. The method of producing the plastic cylinder head cover according to claim 1, wherein the oil control valve holder is heated when the insert pin is inserted into the hole of the oil control valve holder.

3. A method of producing a plastic cylinder head cover having an oil control valve holder as an integral part thereof by insert molding,
   the oil control valve holder including:
      a mounting surface configured to be mounted to a cylinder head,
      a hole oriented along an axis inclined relative to a plane direction of the mounting surface, and
      a first face and a second face, each face containing an open end of the hole,
   the method comprising:
      setting the oil control valve holder in one of a pair of molds configured to approach and separate from each other;
      clamping the pair of molds with the set oil control valve holder; and
      injecting a plastic material into a plurality of mold cavities formed by the clamping of the pair of molds with the set oil control valve holder, wherein
      when the oil control valve holder is set in the one of the pair of molds, an abutment insert is movable within a passage defined by the one of the pair of molds so as to abut against the mounting surface near one of the two faces of the oil control valve holder having a larger area than the other.

4. The method of producing the plastic cylinder head cover according to claim 3, wherein the pair of molds has a mold structure in which one of the plurality of mold cavities near the one of the two faces of the oil control valve having a smaller area than the other has a thickness that is smaller than a thickness of the other of the plurality of mold cavities.

5. The method of producing the plastic cylinder head cover according to claim 1, wherein the abutment insert includes an abutment surface and a non-abutment surface that face the mounting surface of the oil control valve holder, the abutment surface being configured to contact the mounting surface of the oil control valve holder to prevent deformation of the oil control valve holder during the insert molding, and the non-abutment surface being inclined relative to the abutment surface so as to define a gap between the non-abutment surface and the mounting surface of the oil control valve holder.

6. The method of producing the plastic cylinder head cover according to claim 3, wherein the abutment insert includes an abutment surface and a non-abutment surface that face the mounting surface of the oil control valve holder, the abutment surface being configured to contact the mounting surface of the oil control valve holder to prevent deformation of the face of the oil control valve holder having the larger area during the insert molding, and the non-abutment surface being inclined relative to the abutment surface so as to define a gap between the non-abutment surface and the mounting surface of the oil control valve holder.

* * * * *